Patented June 28, 1932

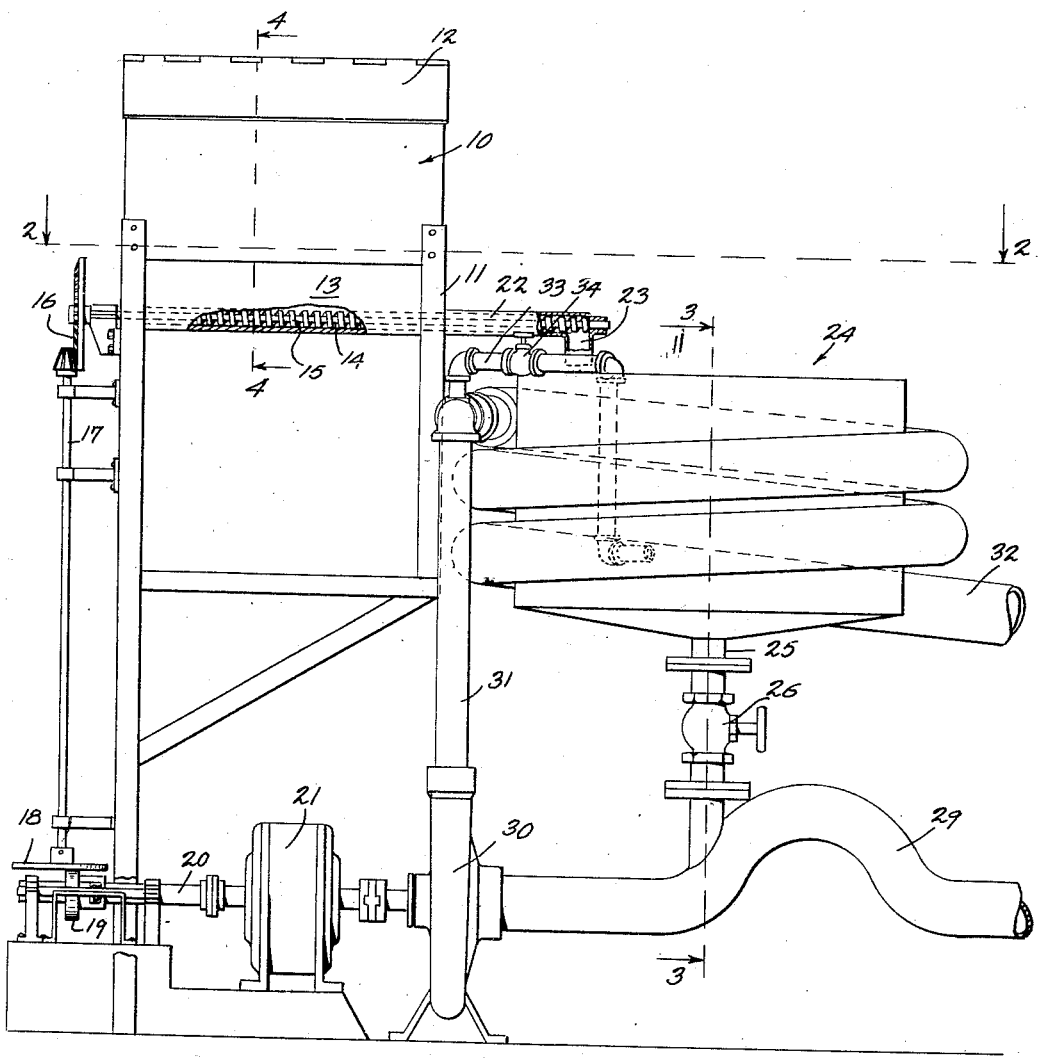

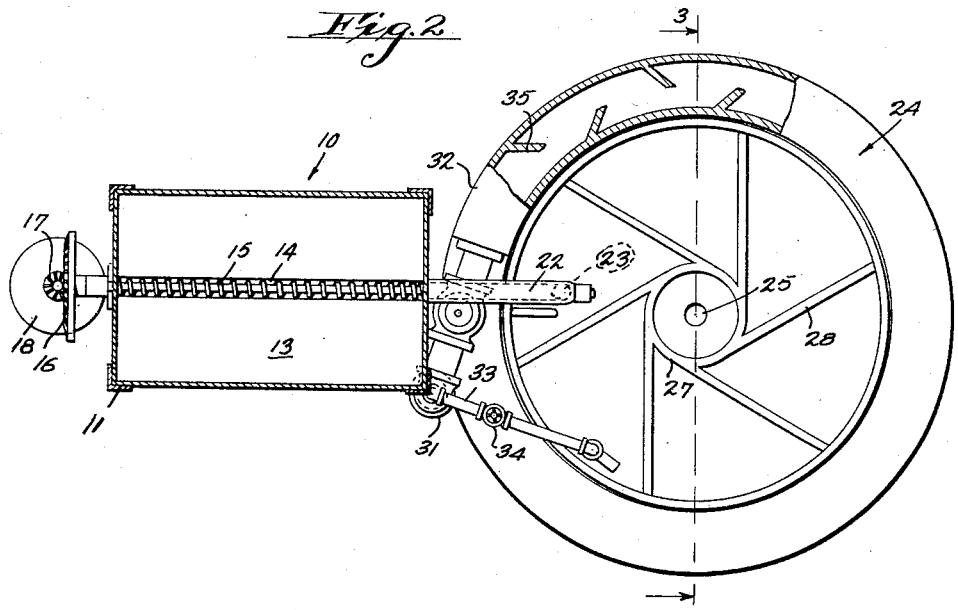
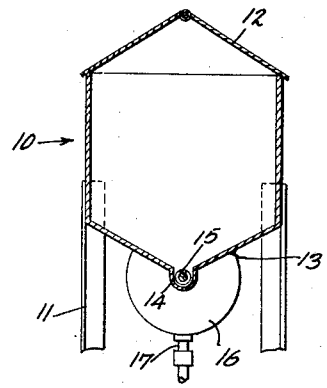
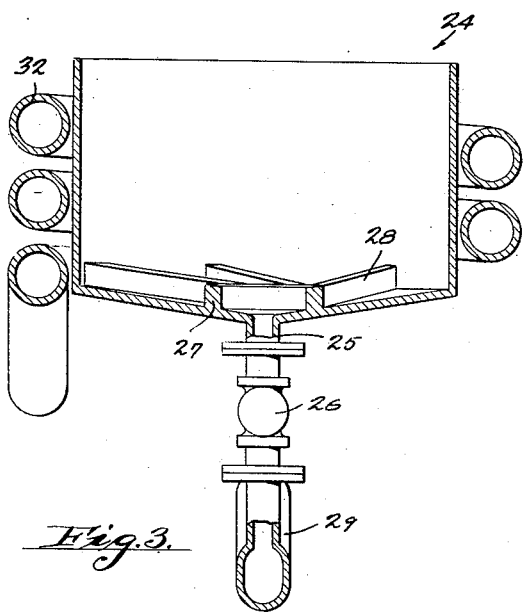

1,864,947

UNITED STATES PATENT OFFICE

WILBER C. SELFRIDGE, OF FULLERTON, CALIFORNIA

DEVICE FOR MIXING FERTILIZER WITH WATER FOR IRRIGATION

Application filed February 13, 1931. Serial No. 515,467.

This invention relates to a machine for mixing fertilizers with water for irrigation purposes. It has been proposed to take irrigation water and mix with the water fertilizers so that when the water is used for irrigation not only will the desired irrigating be accomplished but at the same time there will be an even and adequate distribution of fertilizer over the ground irrigated. Many suitable fertilizers which can be mixed with water for this purpose require a considerable amount of agitation to break up the particles of fertilizer and cause them to be thoroughly mixed or dissolved in the water as the case may be.

It is an object of this invention to provide a machine having a hopper and a mixing chamber with a mechanism for uniformly feeding fertilizer placed in the hopper into the mixing chamber so that the fertilizer can be deposited in the mixing chamber at a uniform rate. In the mixing chamber the fertilizer is to be stirred up and agitated with a small quantity of water and the resulting mixture slowly but continuously admitted to a water supply pipe conveying irrigation water. The invention contemplates introducing the irrigation water with its admitted mixture to a pump which forces the water to the desired locality and which assists in bringing about a thorough and complete mixing of the fertilizer with the water.

Another object of the invention is to provide a machine which is automatic in its nature in that water may be supplied from a suitable source and fertilizer be deposited in the hopper and the machine started operation causing the mixing to take place. After the machine has been started it may be left by the operator who may attend to the proper diverting of the water to bring about the desired irrigation.

With the foregoing and other objects in view, which will be made manifest in the following detailed description, and specifically pointed out in the appended claims, reference is had to the accompanying drawings for an illustrative embodiment of the invention, wherein:

Fig. 1 is a view in side elevation of the improved machine for mixing fertilizer with irrigation water.

Fig. 2 is a sectional view taken substantially upon the line 2—2 upon Fig. 1.

Fig. 3 is a sectional view taken upon the line 3—3 upon Fig. 2.

Fig. 4 is a vertical section taken upon the line 4—4 upon Fig. 1.

Referring to the accompanying drawings, wherein similar reference characters designate similar parts throughout, the improved device comprises a hopper 10 mounted upon suitable supports 11, which hopper has a hinged cover 12 enabling a supply of dry commercial fertilizer to be deposited in the hopper. The hopper has downwardly converging sloping walls 13 and in the lowermost portion of the bottom of the hopper there is formed a channel or recess 14. In this channel or recess there is disposed a feed screw 15 driven through suitable gearing, indicated at 16, from a shaft 17. Shaft 17 carries a friction plate 18 engaged by a friction roller 19 on shaft 20 which is driven by motor 21. The friction roller 19 is adjustable along the length of shaft 20 so that the distance of the friction roller from the center of friction plate 18 can be varied. In this manner, although motor 21 may be driven at a constant speed, it is possible to vary the speed of rotation of shaft 17 and thus adjust the speed of rotation of the feed screw 15.

On the side of the hopper there is formed a tubular extension 22 through which feed screw 15 extends. This extension has an outlet 23 arranged over a mixing bowl or chamber 24. Mixing bowl or chamber 24 has a central outlet 25 arranged in its bottom which is valve controlled as by a valve 26. Around the outlet there is formed an annular ridge 27 and suitable baffles 28 may extend outwardly from this ridge toward the sides of the mixing chamber. A water supply pipe 29 leads from a suitable supply of irrigation water, such as for example a sump, reservoir or from water retained by a dam. The outlet 25 is connected to the water supply pipe 29 in such a manner as to form an acute angle with the direction of flow of water through the water supply pipe 29. This arrangement is preferred so that the water flowing in water supply pipe 29 will not build up a back pressure within the outlet 25 but instead will have the tendency to draw the contents of the mixing chamber 24 through the outlet. The water supply pipe 29 leads to a pump indicated at 30, driven by motor 21, and the preferred form of pump is a suitable centrifugal pump. From the pump 30 water is carried through pipe 31 to the upper end of a helical pipe 32 which encircles and is supported by the mixing chamber 24 for purposes of convenience. A branch pipe 33, which is controlled by valve 34, leads from pipe 31 to the mixing chamber 24 and has its end tangentially directed so as to produce circulation or a swirling action of the water within the mixing chamber 24.

The interior of pipe 32 is preferably provided with a series of staggered baffles 35 so that as the water passes therethrough it will encounter these baffles and the thorough mixing of the fertilizer with the water will be completed.

The operation of the improved machine is as follows. A supply of fertilizer is first placed in the hopper 10 and the motor 21 started after the position of friction roller 19 has been properly adjusted to give the desired speed to the feed screw 15. The feed screw feeds the fertilizer at a uniform rate through outlet 23 into mixing chamber 24 and as the fertilizer is moved by the feed screw 15 through the tubular extension 22, it is somewhat ground up into small particles which assists in making a complete mixture. The running of the motor 21 also involves the driving of pump 30 which draws in water from the source of supply through water supply pipe 29. Some of the mixture formed in mixing bowl 24 flows out of the mixing chamber through outlet 25, the rate of flow being controlled by adjusting valve 26. This mixture is admitted to and mixed with the incoming fresh water through supply pipe 29. The water and admitted mixture enter pump 30 where the blades of the pump assist in mixing the fertilizer with the water and force the water through pipe 31. Some of the water forced through pipe 31 is taken out through branch pipe 33, the rate and the amount of which is controlled by valve 34. This water which is thus removed and returned to mixing chamber 24 is for forming the primary mix with the incoming dry fertilizer. The major portion of water discharged through pipe 31 passes through the baffled pipe 32 and as it encounters the baffles the mixing operation is completed. Pipe 32 leads directly to the irrigation ditch, or to an irrigation standpipe, or wherever the water is to be used. The baffles 28 in the mixing chamber have the tendency of breaking up the swirling action of the water within the mixing chamber and assist in this manner of bringing about a thorough mix in the mixing chamber. The ridge 27 surrounding the outlet serves to prevent unmixed or undissolved fertilizer from passing directly into the outlet 25, that is this ridge serves as a small retaining wall for the fertilizer, giving the fertilizer an opportunity to mix with the water in the mixing chamber before being carried therefrom through the outlet.

From the above described construction it will be appreciated that a simple, novel and advantageous device is provided for mixing fertilizer with irrigation water. The device may be set in operation and on having the valves 34 and 26 adjusted and the speed of rotation of feed screw 15 adjusted it may be left alone causing the fertilizer to be continually and uniformly fed to the mixing chamber, mixed therein, and admitted to the irrigation water wherein the mixture is completed so that when the irrigation water is discharged from the machine it has the fertilizer uniformly and thoroughly mixed therewith.

Various changes may be made in the details of construction without departing from the spirit or scope of the invention as defined by the appended claims.

I claim:

1. A device for mixing fertilizer with water comprising means providing a mixing chamber, there being a valve controlled outlet therefrom, a water supply pipe connected to the outlet so as to receive mixture therefrom, and a baffled conduit connected to the water supply pipe and having an outlet outside of the chamber through which water and admitted mixture are caused to pass, delivering mixture from the device.

2. A device for mixing fertilizer with water comprising means providing a mixing chamber, there being a valve controlled outlet therefrom, a water supply pipe connected to the outlet so as to receive mixture therefrom, a baffled conduit connected to the water supply pipe and having an outlet outside of the chamber through which water and admitted mixture are caused to pass, delivering mixture from the device, and means for supplying the mixing chamber with water from the supply pipe.

3. A device for mixing fertilizer with water comprising means providing a mixing chamber, there being a valve controlled outlet therefrom, a water supply pipe connected to the outlet so as to receive mixture therefrom, a baffled conduit connected to the water supply pipe and having an outlet outside of the chamber through which water and admitted mixture are caused to pass delivering mixture from the device, means for supplying the mixing chamber with water from the supply pipe, and means for supplying fertilizer to the mixing chamber at a predetermined rate.

4. A device for mixing fertilizer with water comprising a mixing chamber, a hopper adapted to receive fertilizer, a feed screw in the hopper, means for driving the feed screw to feed fertilizer to the mixing chamber, means for supplying water to the mixing chamber, said mixing chamber having a valve controlled outlet, a water supply pipe adapted to receive mixture from the mixing chamber, and a baffled conduit connected to the water supply pipe and having an outlet outside of the chamber through which the water and admitted mixture are caused to pass, delivering mixture from the device.

5. A device for mixing fertilizer with water comprising a mixing chamber, a hopper adapted to receive fertilizer, a feed screw in the hopper, means for driving the feed screw to feed fertilizer to the mixing chamber, said mixing chamber having a valve controlled outlet, a water supply pipe connected thereto so as to receive some of the mixture from the mixing chamber, a branch pipe connected to the water supply pipe for delivering water therefrom to the mixing chamber, and a baffled conduit surrounding the mixing chamber and mounted thereon through which water from the water supply pipe and its admitted mixture are caused to pass.

6. A device for mixing fertilizer with water comprising a mixing chamber, a hopper adapted to receive fertilizer, a feed screw in the hopper, means for driving the feed screw to feed fertilizer to the mixing chamber, means for adjusting the rate of rotation of the feed screw, means for supplying water to the mixing chamber, said mixing chamber having a valve controlled outlet, a water supply pipe adapted to receive mixture from the mixing chamber, a pump to which the water supply pipe leads, and a delivery pipe leading from the pump.

7. A device for mixing fertilizer with water providing means providing a mixing chamber, a hopper adapted to receive fertilizer, a feed screw for feeding fertilizer from the hopper to the mixing chamber at a uniform rate, a motor, adjustable means for causing the feed screw to be driven by the motor, a water supply pipe, a valve controlled outlet leading from the mixing chamber to the water supply pipe, a pump driven by the motor in the water suply pipe, a valve controlled branch pipe for supplying the mixing chamber with water from the water supply pipe, and a baffled conduit encircling and mounted on the mixing chamber into which the water supply pipe leads.

8. A device for mixing fertilizer with water providing means providing a mixing chamber, a hopper adapted to receive fertilizer, a feed screw for feeding fertilizer from the hopper to the mixing chamber at a uniform rate, a motor, adjustable means for causing the feed screw to be driven by the motor, a water supply pipe, a valve controlled outlet leading from the mixing chamber to the water supply pipe, a pump driven by the motor in the water supply pipe, a valve controlled branch pipe for supplying the mixing chamber with water from the water supply pipe, and a baffled conduit encircling and mounted on the mixing chamber into which the water supply pipe leads, said mixing chamber having baffles therein.

9. The method of mixing fertilizer with water which consists of continuously introducing fertilizer into a mixing chamber to be mixed with liquid therein, continuously withdrawing some of the mixture and mixing it with water from a water supply to form a dilute mixture, returning some of the dilute mixture to the mixing chamber to be mixed with incoming fertilizer, and separately delivering the remainder of the dilute mixture.

10. The method of mixing fertilizer with water which consists of continuously introducing fertilizer into a mixing chamber to be mixed with liquid therein, continuously withdrawing some of the mixture and mixing it with water from a water supply to form a dilute mixture, delivering the dilute mixture to a pump continuously, withdrawing some of the dilute mixture after it has left the pump and returning it to the mixing chamber, and delivering the remainder of the dilute mixture.

11. A device for mixing fertilizer with water comprising means providing a mixing chamber having an outlet, means for feeding fertilizer to the mixing chamber, a water supply pipe connected to the outlet, a pump to which the water supply pipe leads, a delivery pipe leading from the pump, means for supplying liquid to the mixing chamber from the delivery pipe, a motor for driving the pump and means for driving the fertilizer feeding means by the motor.

12. A device for mixing fertilizer with water comprising means providing a mixing chamber having an outlet, means for feeding fertilizer to the mixing chamber, a water supply pipe connected to the outlet, a pump to which the water supply pipe leads, a delivery pipe leading from the pump, means for supplying liquid to the mixing chamber from the delivery pipe, a motor for driving the pump, and adjustable means for driving the fertilizer feeding means by the motor whereby the rate of feed of fertilizer may be varied.

13. A device for mixing fertilizer with water comprising means providing a mixing chamber having an outlet, a hopper, a feed screw in the hopper adapted upon rotation to continuously deliver fertilizer from the hopper to the mixing chamber at a predetermined rate, a water supply pipe connected to the outlet adapted to receive mixture from the mixing chamber, a pump to which the water supply pipe leads, a delivery pipe leading from the pump, a branch pipe leading from the delivery pipe to the mixing chamber, a motor for driving the pump, and adjustable means for driving the feed screw by the motor whereby the rate of feed may be varied, said pipes and outlet being continuously open so that the device may be continuously supplied with water and fertilizer and delivery of mixture continuously take place.

In testimony whereof I have signed my name to this specification.

WILBER C. SELFRIDGE.